(12) United States Patent
Gangal et al.

(45) Date of Patent: Mar. 24, 2015

(10) Patent No.: US 8,985,675 B1

(54) VEHICLE LIFTGATE REINFORCEMENT

(71) Applicant: Ford Global Technologies, LLC, Dearborn, MI (US)

(72) Inventors: Maneesh Gangal, Troy, MI (US); Rajinder Pal Singh, Plymouth, MI (US); Siavash Osooli, Commerce, MI (US); Pinak Narhari Dave, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/134,410

(22) Filed: Dec. 19, 2013

(51) Int. Cl.
*B60J 5/10* (2006.01)

(52) U.S. Cl.
CPC ..................... *B60J 5/107* (2013.01)
USPC ..................................... 296/146.8

(58) Field of Classification Search
CPC ............. B60J 5/10; B60J 1/107; B60Q 1/00; B60Q 1/30; B60Q 1/44
USPC .............. 296/146.6, 106, 56, 146.8; 362/487, 362/501, 544, 546, 549, 459
See application file for complete search history.

(56) References Cited

U.S. PATENT DOCUMENTS

| | | | |
|---|---|---|---|
| 4,353,111 A | 10/1982 | Gallitzendorfer et al. | |
| 4,851,810 A | 7/1989 | Vitale et al. | |
| 6,644,707 B2 * | 11/2003 | McLaughlin et al. | 296/26.09 |
| 7,614,681 B2 | 11/2009 | Saitoh et al. | |
| 2012/0262934 A1 | 10/2012 | Disley et al. | |
| 2013/0201711 A1 * | 8/2013 | Radgens | 362/516 |

OTHER PUBLICATIONS

Declaration of Rajinder Pal Singh Under 37 C.F.R. 1.132 and Exhibit A ("2014 Lincoln MKC—Top Speed").
2014 Lincoln MKC—Top Speed, http://www.topspeed.com/cars/lincoln/2014-lincoln-mkc-ar140458.html, 11 pages.

* cited by examiner

*Primary Examiner* — Dennis H Pedder
(74) *Attorney, Agent, or Firm* — Jason C. Rogers; Bejin Bieneman PLC

(57) ABSTRACT

A vehicle liftgate system comprises an outer panel that includes a Class A surface and a sole lamp opening extending for a first horizontal distance that greater than half, but less than all, of a width of the outer panel. The liftgate system further comprises a reinforcement having a perimeter corresponding to a perimeter of the lamp opening and configured to accommodate at least one lamp assembly.

20 Claims, 6 Drawing Sheets

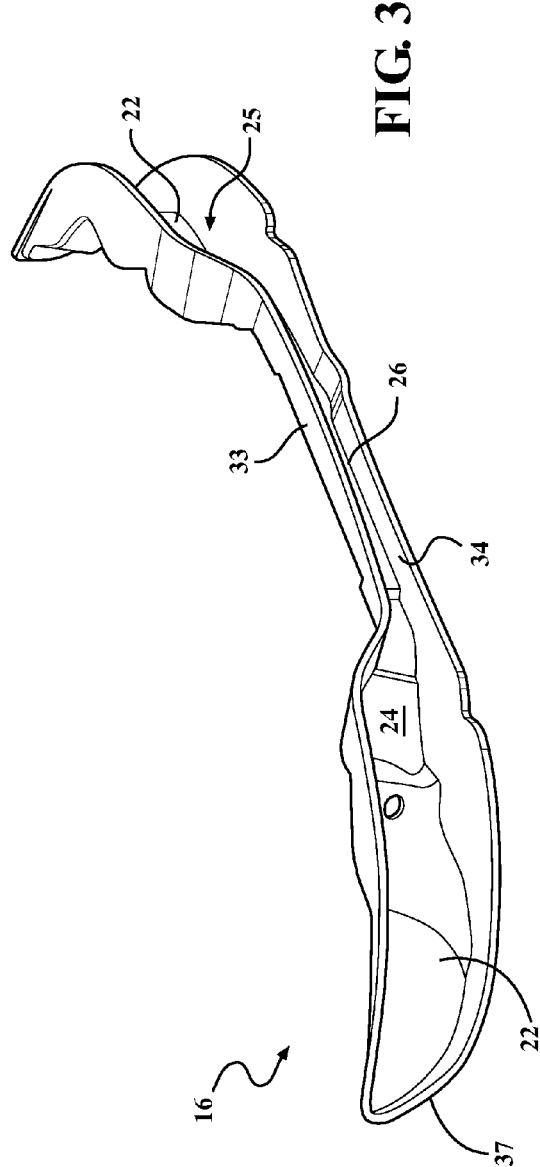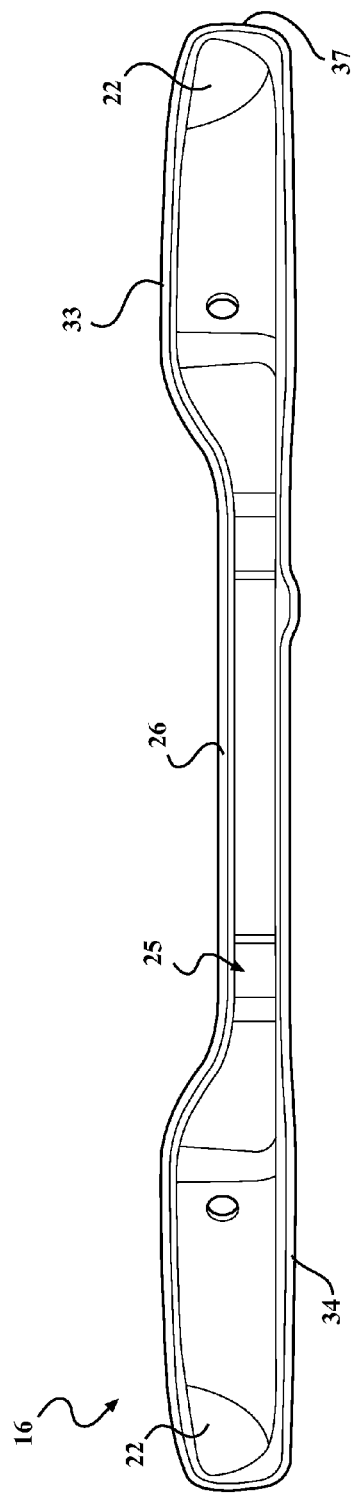

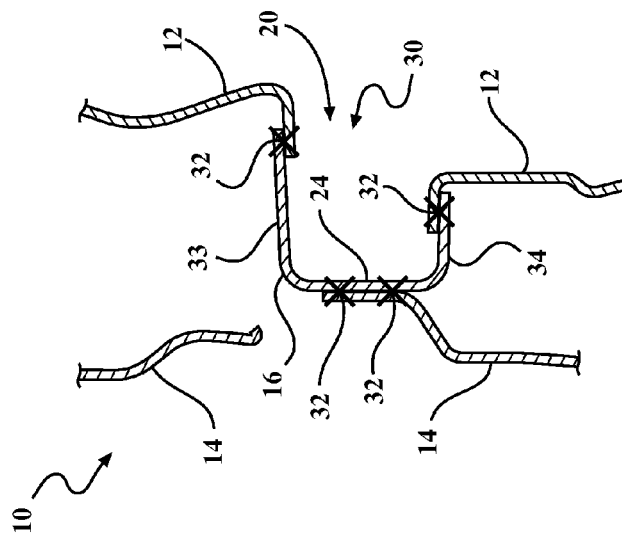
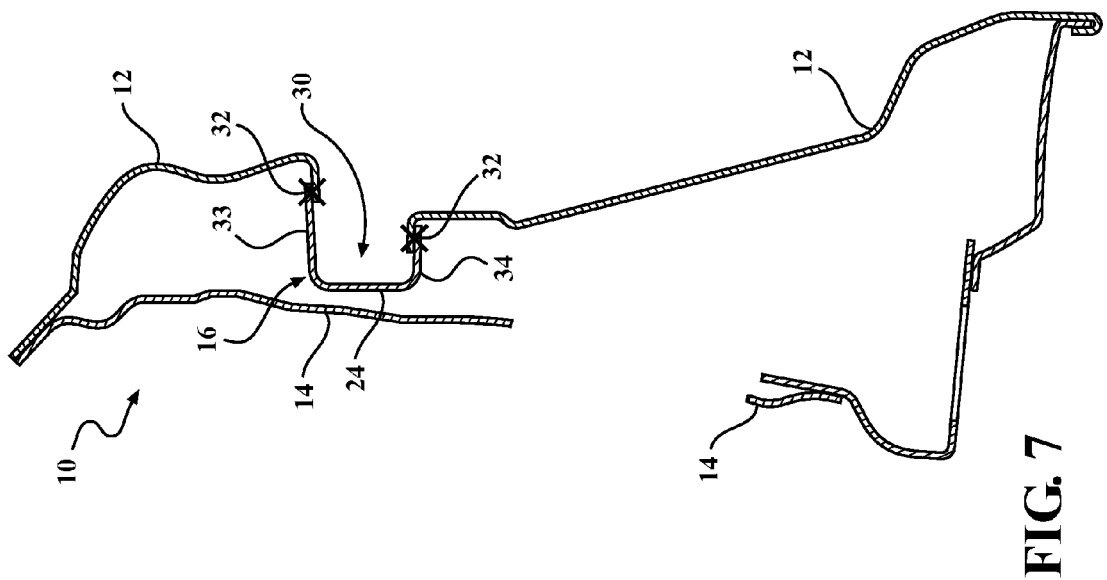

VEHICLE LIFTGATE REINFORCEMENT

BACKGROUND

In vehicles featuring a hatchback or liftgate, the vehicle liftgate may accommodate one or more lamps that comprise some portion of a vehicle's tail-lights. However, at present, in some vehicles lamp coverings in a liftgate terminate at an edge of the liftgate. In other vehicles, tail-lights may continue from a vehicle liftgate to a rear or side portion of a vehicle body. In either case, the tail-light includes a "cutline," i.e., a break between the tail-light and a Class A surface of an outer liftgate panel to accommodate opening the liftgate. Present designs do not allow for a Class A surface to entirely surround a tail-light, nor for avoiding cutlines between tail-lights and a Class A surface of a vehicle.

DRAWINGS

FIG. 3 is a perspective view of an exemplary reinforcement of the liftgate system of FIG. 1.

FIG. 4 is a front view of an exemplary reinforcement of the liftgate system of FIG. 1.

FIGS. 7-9 are respective cross-sectional views of the exemplary liftgate system of FIG. 1.

DETAILED DESCRIPTION

Figure 1:
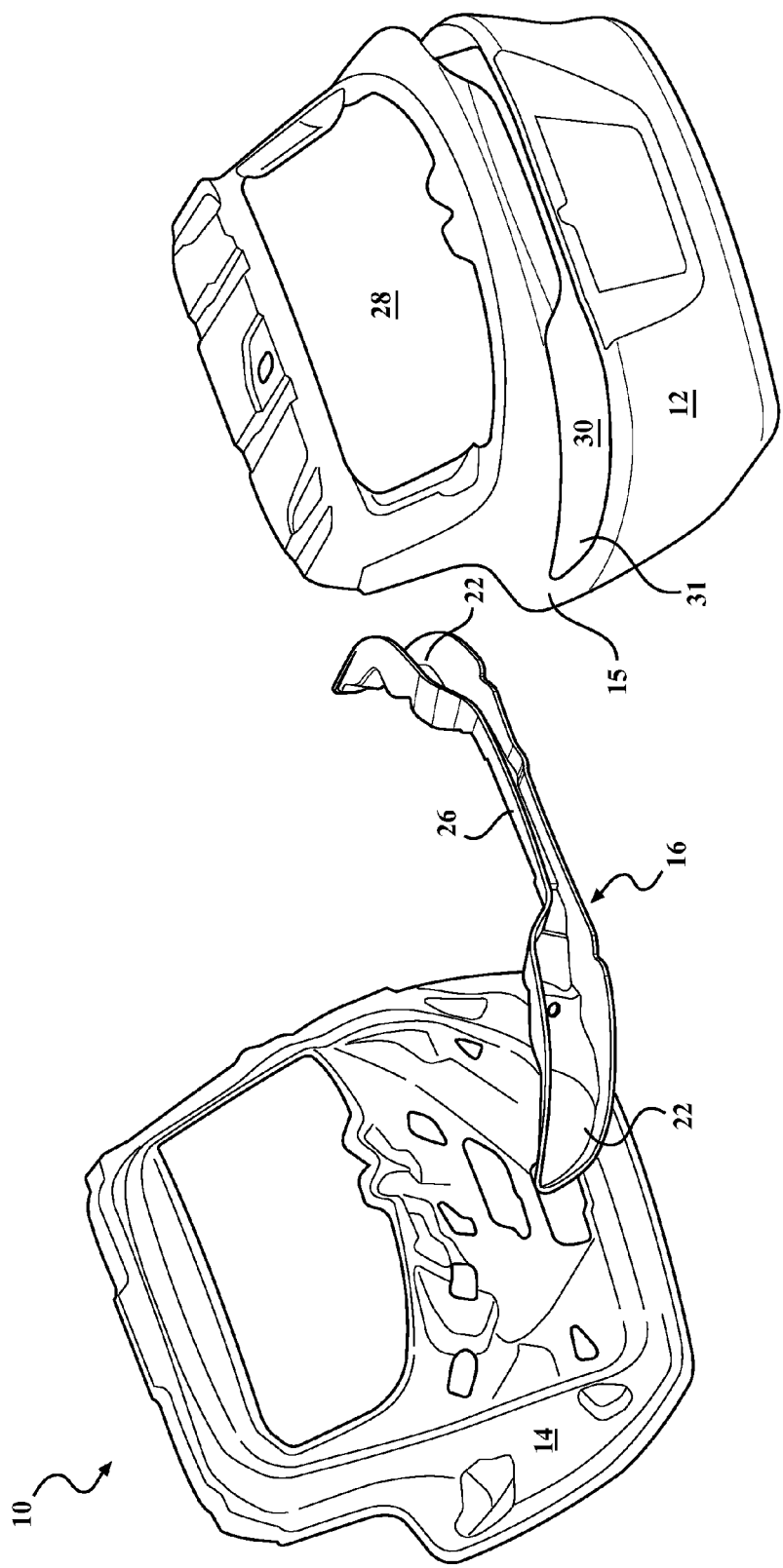
FIG. 1 is an exploded view of an exemplary liftgate system.

FIG. 1 is an exploded view of an exemplary liftgate system 10. An outer panel 12 generally includes a Class A surface such as is known. The outer panel 12 is configured to be mated to an inner panel 14. A generally elongate reinforcement 16 is disposed between the outer panel 12 and the inner panel 14. Each of the panels 12, 14, and the reinforcement 16 may include sheet-metal or the like, and may be formed by a known mechanism such as stamping, hydro-forming, etc. Advantageously, the outer panel 12 may be formed of a single piece of sheet metal. Likewise, the reinforcement 16 may be formed of a single piece of sheet metal. Accordingly, the liftgate system 10, because the outer panel 12 and the reinforcement 16 may each be formed from a single piece of sheet metal, employs fewer parts than prior liftgates, reducing design and manufacturing complexity and costs.

Figure 5:
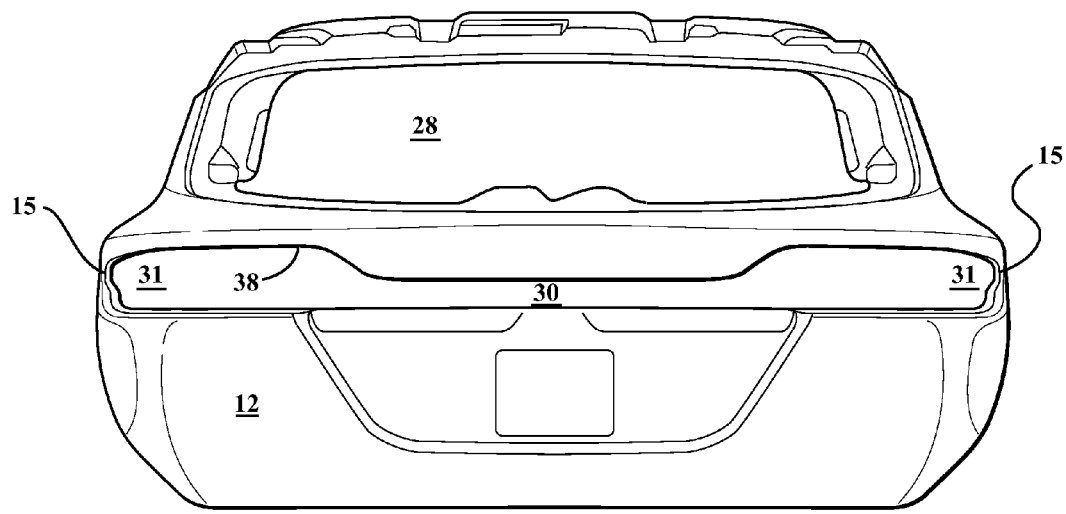
FIG. 5 is a front view of an exemplary outer panel of the liftgate system of FIG. 1.

As seen in FIGS. 1 and 5, the outer panel 12 includes a generally rectangular window opening 28, as well as a generally elongate lamp opening 30, the opening 30 being configured to accommodate the reinforcement 16. For example, a perimeter 37 of the reinforcement 16 may be generally congruent with a perimeter 38 of the opening 30 (see FIGS. 3 and 4). Respective ends 31 of the opening 30 are adjacent to respective side areas 15 of the panel 12. In an exemplary embodiment of the liftgate system 10, one and only one lamp opening 30, as distinguished from the window opening 28, is included in the panel 12. That is, the opening 30 is the sole opening in the panel 12 configured to accommodate reinforcement 16 for a lamp assembly 20 (see FIG. 2), the lamp assembly 20 being generally known. Further, embodiments are possible in which the window opening 28 is omitted, or in which more than one lamp assembly 20 is included.

Figure 6:
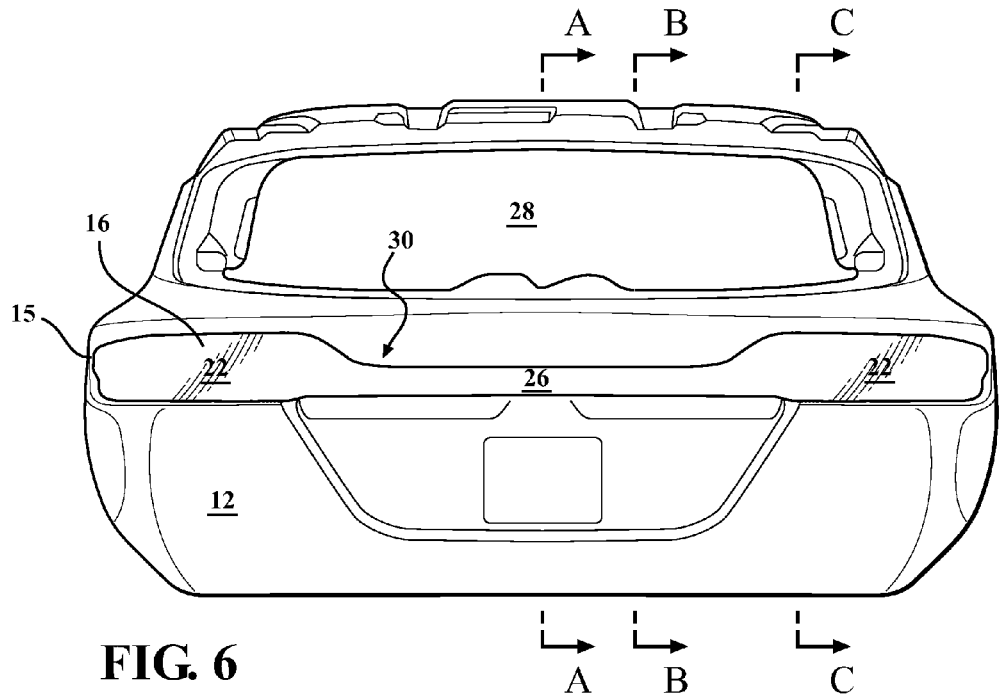
FIG. 6 is a front view of a reinforcement installed in an opening of a liftgate outer panel of the liftgate system of FIG. 1.

The lamp opening 30, and, often, also the window opening 28, generally extends for respective first and second horizontal distances that are more than half, but less than all, of a width of the panel 12. Because the horizontal distance of the opening 30 is less than the total width of the panel 12, the area 15 is provided with a Class A surface between the opening 30 and the cutline 13. Further, as best seen in FIGS. 5 and 6, a width of the panel 12 may be greater at a location of the lamp opening 30 than at a location of the panel 12, and/or the lamp opening 30 may extend for a greater width in the panel 12 than the window opening 28.

Figure 2:
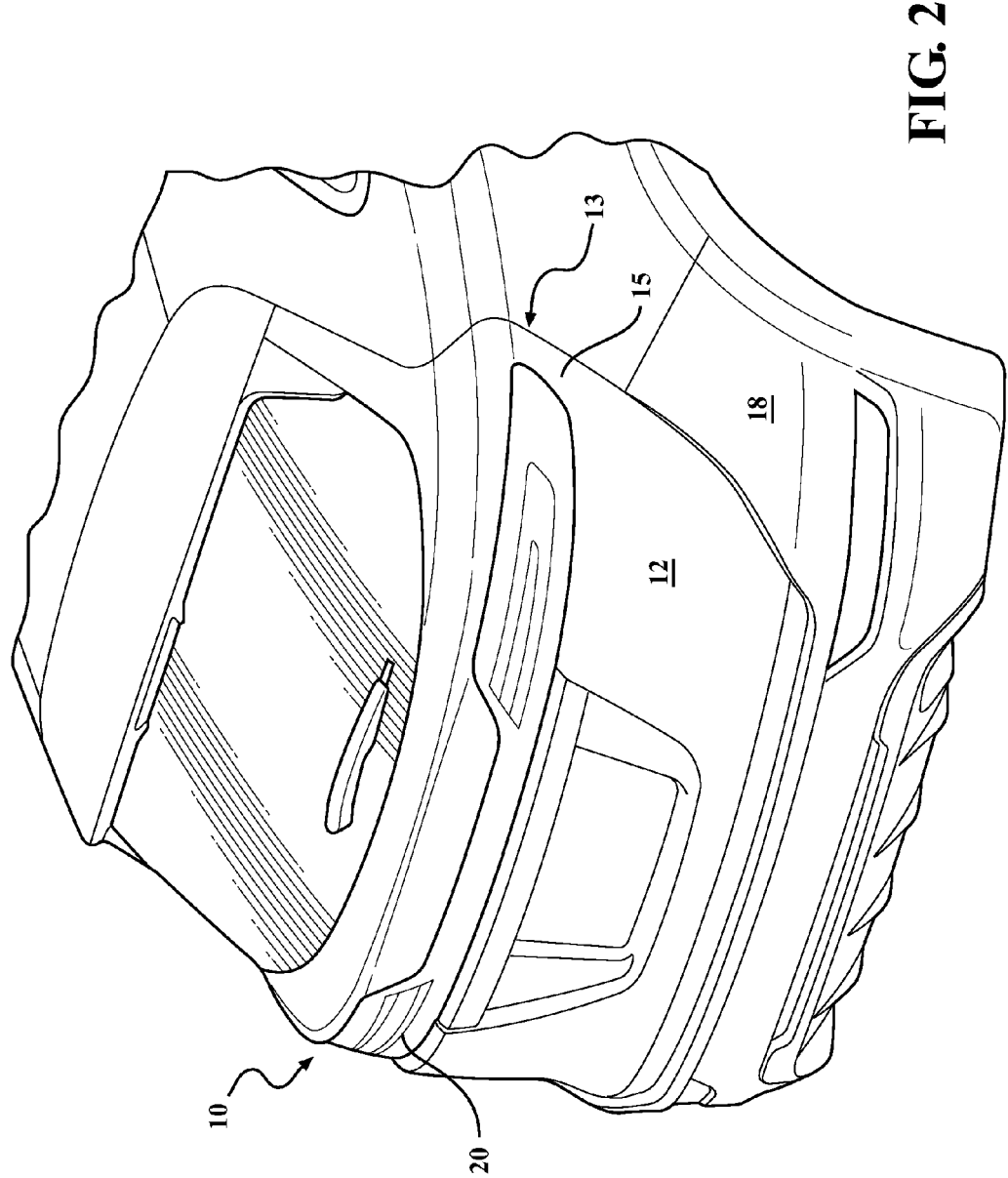
FIG. 2 is a perspective view of the liftgate system of FIG. 1 installed on a portion of a vehicle.

FIG. 2 is a perspective view of the exemplary liftgate system 10 of FIG. 1 installed on a vehicle. It will be appreciated that the liftgate system 10 is generally configured for hinged attachment to a vehicle body. As seen in FIG. 2, the opening 30 may accommodate a lamp assembly 20 in addition to the reinforcement 16. Further, each of the side areas 15 is bounded in part by an end 31 of the opening 30 and an edge of the panel 12, thereby providing a Class A surface between an edge of the lamp assembly 20 and a cutline 13 between the panel 12 edge and a vehicle body 18.

As best seen in FIGS. 3 and 4, the reinforcement 16 includes first and second ends 22, connected by a central connecting portion 26 of the reinforcement 16. The reinforcement 16 may be formed to include an upper wall 33 and a lower wall 34, each at a generally right or obtuse angle, which angle may be rounded, have a curved vertex, etc., with a back wall 24 of the reinforcement 16, the walls 33, 34, and 24 thereby forming a recess 25 extending from a first end 22 to a second end 22 of the reinforcement 16.

At each of the ends 22, the walls 33, 34, and 24, and accordingly the recess 25 formed thereby, may be shaped to accommodate a lamp assembly 20. Moreover, to accommodate the lamp assembly 20, a height and/or depth of the recess 25 may be greater at the ends 22 than in the connecting portion 26. For example, referring to FIG. 6, a first height of the reinforcement 16 is greater at the axis CC in an end 22 than a second height of the reinforcement at the axes AA and BB in the central connecting portion 26. Moreover, the reinforcement 16 is generally shaped to conform to the opening 30 in the outer panel 12 and/or or to a shape of a vehicle body 18. For example, in the presently illustrated exemplary embodiment, the ends 22 of the reinforcement 16 curve inwardly away from the connecting portion 26.

FIG. 6 is a front view of a reinforcement 16 installed in an opening 30 of a liftgate outer panel. As seen in FIG. 6, the reinforcement 16 is formed in a shape that corresponds to, e.g., is generally congruent with, a shape of the opening 30, such that, referring back to FIGS. 3 and 4, all or substantially all of an outer perimeter edge 37 of the reinforcement 16 contacts an inner perimeter 38 of the opening 30 when the reinforcement 16 is installed in the opening 30.

Figure 9:
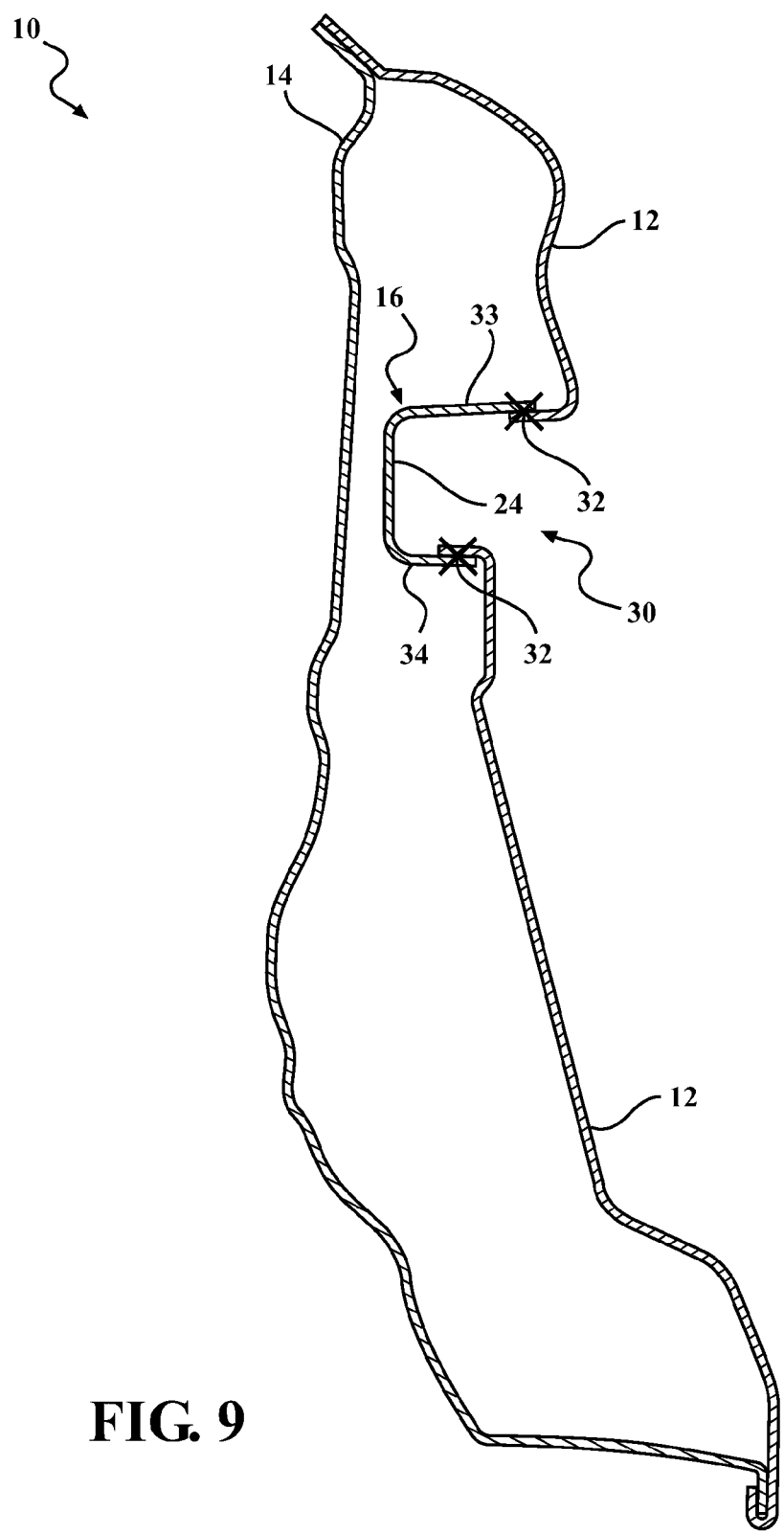

Further referring to FIG. 6, the lines AA, BB, and CC correspond respectively to locations of cross-sections of the liftgate system 10 shown in FIGS. 7, 8, and 9. As seen in FIGS. 7-9, the reinforcement 16 is secured to the outer panel 12 at a plurality of attachment points 32, e.g., by a weld, bolt, rivet, and/or structural adhesive. Further, as seen in FIG. 8, the reinforcement 16 may likewise be secured to the inner panel 14 at a plurality of points 32. However, because of a shape of the panel 14, holes in the panel 14 to accommodate various vehicle assemblies, conduits, etc., the back wall of the reinforcement 16 may contact the inner panel 14 only at certain locations. In contrast, although not necessarily, generally all of the upper wall 33 and the lower wall 34 may contact the outer panel 12.

As explained herein, the exemplary liftgate system 10 advantageously provides the area 15 that includes a Class A surface between the tailgate assembly 20 and a cutline 13 between a liftgate outer panel 12 and a vehicle body 18. Further, as mentioned above, in the exemplary embodiment the liftgate system 10 advantageously requires only a single piece of metal to provide the lamp reinforcement 16 to the outer panel 12.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A vehicle liftgate system, comprising:
   a liftgate outer panel that includes a Class A surface and a sole lamp opening extending for a first horizontal distance that is greater than half, but less than all, of a width of the outer panel; and
   a reinforcement having a perimeter corresponding to a perimeter of the sole lamp opening and configured to accommodate at least one lamp assembly.

2. The liftgate system of claim 1, wherein the outer panel is formed of a single piece of sheet metal.

3. The liftgate system of claim 1, wherein the reinforcement is formed of a single piece of sheet metal.

4. The liftgate system of claim 1, further comprising an inner panel configured to be mated to the outer panel.

5. The liftgate system of claim 1, wherein:
   the outer panel includes a window opening in addition to the lamp opening; and
   the first horizontal distance in the outer panel is greater than a second horizontal distance of the window opening.

6. The liftgate system of claim 1, wherein the reinforcement has a first height at an end of the reinforcement that is greater than a second height at a central portion of the reinforcement.

7. The liftgate system of claim 1, wherein the reinforcement includes a recess extending for a width thereof.

8. The liftgate system of claim 7 wherein the recess is configured to accommodate the lamp assembly.

9. The liftgate system of claim 7, wherein the recess is formed by an upper wall, a lower wall, and a back wall of the reinforcement.

10. The liftgate system of claim 1, further comprising at least a portion of a vehicle body, wherein a cutline is formed between an area of the outer panel adjacent to an end of the lamp opening and the vehicle body.

11. The liftgate system of claim 10, wherein the Class A surface is adjacent on a first side to the cutline and on a second side to the lamp assembly.

12. The liftgate system of claim 1, wherein the reinforcement includes first and second ends that each curve in a same direction away from a central portion of the lamp assembly.

13. The liftgate system of claim 1, wherein the reinforcement is secured to the outer panel with at least one of welding and a structural adhesive.

14. The liftgate system of claim 11, wherein the reinforcement is secured to an inner panel with at least one of welding and a structural adhesive.

15. A vehicle liftgate system, comprising:
   a liftgate outer panel formed from a first single piece of sheet metal, the outer panel including a Class A surface and a sole lamp opening extending for a first horizontal distance that is greater than half, but less than all, of a width of the outer panel; and
   a reinforcement formed from a second single piece of sheet metal, the reinforcement having a perimeter corresponding to a perimeter of the sole lamp opening and configured to accommodate at least one lamp assembly.

16. The liftgate system of claim 15, further comprising at least a portion of a vehicle body, wherein a cutline is formed between an area of the outer panel adjacent to an end of the lamp opening and the vehicle body.

17. The liftgate system of claim 16, wherein the Class A surface is adjacent on a first side to the cutline and one a second side to the lamp assembly.

18. The liftgate system of claim 15, wherein the reinforcement has a first height at an end of the reinforcement that is greater than a second height at a central portion of the reinforcement.

19. The liftgate system of claim 15, wherein the reinforcement includes a recess extending for a width thereof that is configured to accommodate the lamp assembly.

20. The liftgate system of claim 15, further comprising an inner panel configured to be mated to the outer panel, wherein the reinforcement is secured to the outer panel and the inner panel with at least one of welding and a structural adhesive.

* * * * *